(12) United States Patent
Schiele et al.

(10) Patent No.: US 7,972,241 B2
(45) Date of Patent: Jul. 5, 2011

(54) DRIVE CONTROL DEVICE OF AN AUTOMATIC GEARBOX FOR A MOTOR VEHICLE AND METHOD THEREFOR

(75) Inventors: Peter Schiele, Kressbronn (DE); Thilo Schmidt, Meckenbeuren (DE); Klaus Steinhauser, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 823 days.

(21) Appl. No.: 11/916,679

(22) PCT Filed: Jun. 14, 2006

(86) PCT No.: PCT/EP2006/005729
§ 371 (c)(1),
(2), (4) Date: Dec. 6, 2007

(87) PCT Pub. No.: WO2006/136320
PCT Pub. Date: Dec. 28, 2006

(65) Prior Publication Data
US 2008/0188351 A1    Aug. 7, 2008

(30) Foreign Application Priority Data

Jun. 22, 2005   (DE) .......................... 10 2005 028 848

(51) Int. Cl.
*F16H 63/02*  (2006.01)
(52) U.S. Cl. ............................ 477/98; 475/117; 475/137

(58) Field of Classification Search .................. 475/117, 475/137; 477/98
See application file for complete search history.

(56) References Cited

U.S. PATENT DOCUMENTS

| 5,306,215 A | | 4/1994 | Mann et al. |
| 6,007,453 A | * | 12/1999 | Ohkuma et al. ................. 477/76 |
| 6,692,402 B2 | | 2/2004 | Nakamori et al. |
| 2004/0179962 A1 | | 9/2004 | Hopper |

FOREIGN PATENT DOCUMENTS

| DE | 40 10 552 A1 | 10/1990 |
| DE | 101 62 973 A1 | 8/2002 |
| DE | 10 2004 012 639 A1 | 10/2004 |
| EP | 1 223 365 A2 | 7/2002 |

* cited by examiner

*Primary Examiner* — Sherry Estremksy
(74) *Attorney, Agent, or Firm* — Davis & Bujold, P.L.L.C.

(57) ABSTRACT

A drive control device of an automatic transmission of a vehicle. The transmission having a main oil pump driven by an internal combustion engine, an electrically driven auxiliary oil pump and a hydraulic control device; a device for determining the required volumetric flow rate needed to determine the oil/hydraulic target volumetric flow rate during current operating conditions, based on the transmission oil temperature; a device for determining the volumetric flow rate to determine the actual volumetric flow rate that can be delivered during the current operating conditions by the main and/or auxiliary oil pump, and a device for controlling the target volumetric flow rate to reduce the target volumetric flow rate to at least the currently deliverable actual volumetric flow rate, if the currently deliverable actual volumetric flow rate is below the current target volumetric flow rate.

11 Claims, 2 Drawing Sheets

US 7,972,241 B2

DRIVE CONTROL DEVICE OF AN AUTOMATIC GEARBOX FOR A MOTOR VEHICLE AND METHOD THEREFOR

This application is a national stage completion of PCT/EP2006/005729 filed Jun. 14, 2006, which claims priority from German Application Serial No 10 2005 028 848.0 filed Jun. 22, 2005.

FIELD OF THE INVENTION

The invention relates to a drive control device for an automatic transmission for a motor vehicle comprising an electrically drivable auxiliary oil pump and a method.

BACKGROUND OF THE INVENTION

DE 101 62 973 A1 discloses a drive control device in conjunction with an automatic transmission for an electrically drivable auxiliary oil pump. To this end, a mechanical main oil pump, which can be driven by the internal combustion engine, is used in combination with a motor stop automatic (MSA) element and the auxiliary oil pump. The auxiliary oil pump is necessary, for example, in the event of a traffic-related standstill of the motor vehicle since the motor stop automatic element will shut down the internal combustion engine and therefore the drive of the main oil pump. A sufficient oil-hydraulic volumetric flow rate and/or oil pressure must be made available for an automatic transmission so that, for example, the current gear remains engaged or the necessary actuators can be activated for a gear change that is performed while remaining stationary.

The drive of the electric auxiliary oil pump is unfavorable for the electrical on-board system of a motor vehicle and decreases its overall degree of effectiveness. In order to decrease these deficiencies, DE 101 62 973 A1 proposes to adjust the operating voltage, which is supplied to the electrically drivable auxiliary oil pump, based on the measured oil temperature of the automatic transmission. This is intended to maintain the necessary hydraulic pressure and prevent that hydraulic pressure is supplied that is greater than necessary.

In order to reduce the cost for an auxiliary oil pump, EP 1 223 365 A2 proposes a smaller embodiment of this auxiliary oil pump and, in certain operating conditions, to jointly operate the mechanical and the electrical oil pumps in order to maintain the necessary clutch pressure and, when the measured clutch pressure reaches a value, which the mechanically drivable main oil pump can supply by itself, to immediately shut down the auxiliary oil pump.

The state of the art is currently based on the volumetric flow rate and/or oil pressure, which is supplied by the mechanically driven main oil pump and/or the added electrical auxiliary oil pump, being sufficient for all occurring operating conditions.

In this context, the present invention is based on the object of creating a drive control device and a related method for an automatic transmission for a motor vehicle comprising a mechanically driven main oil pump and an electrically drivable auxiliary oil pump, which will make it possible to supply the necessary hydraulic volumetric flow rate and/or pressure in an extended operating range, for example also during the operation of a motor stop automatic element.

SUMMARY OF THE INVENTION

The invention is based on the theory that it is neither productive to size the electrically driven auxiliary oil pump for all possibly occurring operating conditions, nor possible to satisfy all these operating conditions with a limited, large electrically driven auxiliary oil pump.

Therefore, the invention first relates to a drive control device for an automatic transmission for a motor vehicle, wherein the motor vehicle is provided with an automatic transmission comprising a main oil pump that is driven by an internal combustion engine and an electrically drivable auxiliary oil pump, and is further provided with a hydraulic control device for the automatic transmission, comprising a device for determining the required volumetric flow rate in order to determine the oil-hydraulic target volumetric flow rate during the current operating condition of the automatic transmission and the motor vehicle based on the oil temperature within the automatic transmission, further comprising a device for determining the volumetric flow rate in order to determine the actual volumetric flow rate during the current operating condition of the automatic transmission and the motor vehicle delivered by the main oil pump and/or the auxiliary oil pump, and further comprising a device for controlling the target volumetric flow rate in order to reduce the target volumetric flow rate to at least the currently deliverable actual volumetric flow rate if the currently deliverable actual volumetric flow rate exhibits a value that is below the value of the current target volumetric flow rate.

In a particularly preferred embodiment of this drive control device, it comprises a control device for a motor stop automatic element in order to automatically shut down the internal combustion engine during certain operating conditions of the motor vehicle.

The invention also relates to a drive control method for an automatic transmission for a motor vehicle, wherein the motor vehicle is provided with an automatic transmission comprising a main oil pump, which can be driven by the internal combustion engine, and an electrically drivable auxiliary oil pump and comprising a hydraulic control device for the automatic transmission.

According to this method, it is intended that the oil-hydraulic target volumetric flow rate of the automatic transmission, which is required under a current operating condition, is determined based on an oil temperature within the automatic transmission, that the actual volumetric flow rate, which is delivered by the main oil pump and/or the auxiliary oil pump, is determined, and that the value of the target volumetric flow rate is reduced to at least the currently deliverable actual volumetric flow rate, if the currently deliverable actual volumetric flow rate exhibits a value that is below the value for a current target volumetric flow rate.

The invention therefore intends to manipulate the operating strategy of the automatic transmission as a function of the delivery capacity of the solely or jointly operating main oil pump and/or auxiliary oil pump.

For this purpose, the device for determining the required volumetric flow rate is used to determine the current supply requirement as the target volumetric flow rate by way of a mathematical-physical model. In this, the model considers at least the transmission oil temperature.

The device for determining the volumetric flow rate according to the model also determines, for example, whether the determined demand can be supplied solely by the main oil pump that is driven by the internal combustion engine or if optionally a performance specification for the additional demand must be sent to the control of the electrically driven auxiliary oil pump.

If as a result of the comparison between the target volumetric flow rate and the volumetric flow rate, which can be delivered by both or the auxiliary oil pump alone, the latter volumetric flow rate is determined to be insufficient, then a device for controlling the target volumetric flow rate is takes action which will reduce the volumetric flow rate and/or the oil pressure demand.

This has the advantage that by properly selecting these measures by way of manipulating the control operation of the automatic transmission, the current volumetric flow rate demand for transmission oil is reduced to such a degree that the demand can be supplied by the installed pump capacities without the driver hardly noticing this or not noticing this at all. This allows the coverage of those operating ranges in which according to conventional drive control devices the installed pump capacities would not be sufficient. Additionally, the installation of oversized pump capacities, which are common for most operating conditions, is no longer necessary. This lowers costs and is beneficial with respect to consumption and efficiency. The use of a model to establish the target volumetric flow rate and/or the deliverable transmission oil volumetric flow rate can make an otherwise common pressure sensor redundant.

In another embodiment of the method according to the present invention, it is possible in order to more specifically capture the target volumetric flow rate that this step is performed in addition to the oil temperature on the basis of the rotational speed of the mechanically drivable main oil pump and/or the basis of the current operating condition of a motor stop automatic element (for example motor on and/or off) and/or on the basis of the gear changes of the automatic transmission that are performed by the hydraulic control device (up-shift and/or down-shift, shift type) and/or on the basis of the necessary cooling and/or lubrication of the automatic transmission. Additional input values the capturing the volumetric flow rate requirement are certainly possible, for example, in a transmission-controlled roll prevention for the vehicle by combining several transmission control elements when a vehicle stand-still is detected.

It is also possible to design the control operation of the electrically driven auxiliary oil pump to include the regions outside of the actual motor stop automatic operation. The demand for hydraulic supply can thus be supported, for example, during gear changes within a low speed range, during a respectively low flow rate of the mechanically driven main oil pump, or during high temperatures with the associated losses due to leakage.

Additionally, in the high speed range conventional mechanically driven main oil pumps exhibit a significantly excessive volumetric flow rate, which is often taken into account by the use of accordingly expensive and complex variable displacement pumps, especially in order to ensure the oil supply during lower motor speeds.

The electrically driven auxiliary oil pump can also be used to stabilize the pressure supply to improve the quality of gear changes since it is possible that the pressure can occasionally drop due to the low oil supply in reference sample transmissions, when transmission oil temperatures are high or due to wear and tear, and the like.

The electrically driven auxiliary oil pump can also be advantageously added when the cooling oil volumetric flow rate must be increased without simultaneously increasing the rotational speed of the internal combustion engine, which would be counter-productive. This can in turn lead to a smaller design of the transmission oil cooling system, which is advantageous in respect of the costs and the necessary installation space. Additionally, the driver can comprehend the vehicle performance and/or the sound character of the internal combustion engine, which increases the driving comfort and the customer acceptance in comparison to conventional systems.

BRIEF DESCRIPTION OF THE DRAWINGS

The invention will now be described, by way of example, with reference to the accompanying drawings in which.

DETAILED DESCRIPTION OF THE INVENTION

In the present invention the term "automatic transmission" shall be understood as classical stepped automatic transmissions having hydraulic torque converters and to automated manual transmissions, double-clutch transmissions and continuously variable transmissions.

Figure 1:
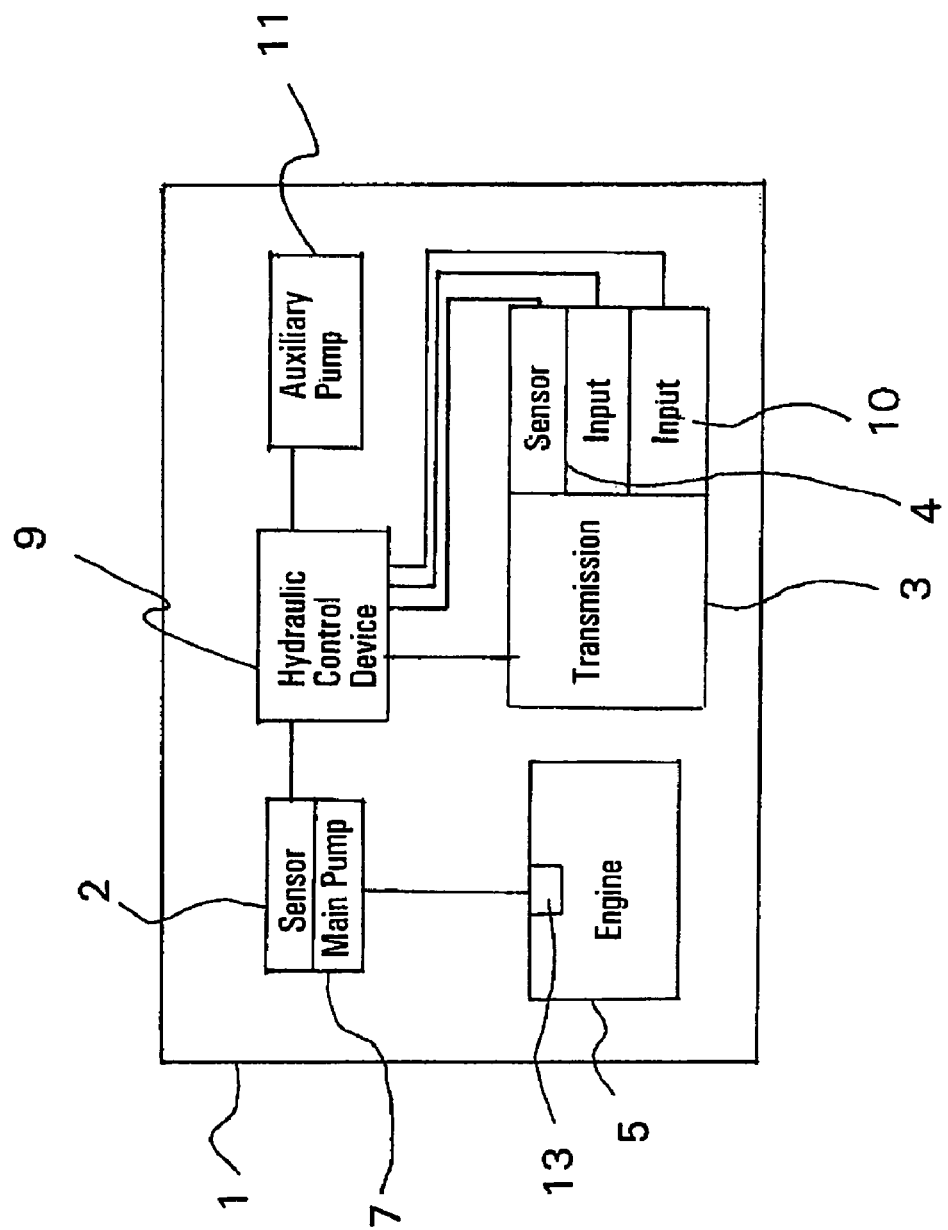
FIG. 1 is a schematic illustration of an embodiment of the drive control device of the invention.

According to the present example, shown in FIG. 1, a passenger car 1 is equipped with an automatic transmission 3 and an internal combustion engine 5 to provide drive. The internal combustion engine 5 during its operation mechanically drives a main oil pump 7 that is associated with the automatic transmission 3.

The internal combustion engine 5 in this example is also associated with a motor stop automatic (MSA) element 13, which automatically shuts the motor 5 down during certain operating conditions and reactivates the motor 5, for example, in response to a drive pedal movement signaling a command to start driving. The possibility for supplying an oil hydraulic volumetric flow rate by the main oil pump 7 is eliminated when the internal combustion engine 5 is turned off (motor off operation). In order to ensure the supply with oil-hydraulic pressure and/or volume primarily for the hydraulic control device 9 of the automatic transmission in such "motor off operating phases", an electrically driven auxiliary oil pump 11 is available that can be operated by the electrical on-board system.

Although the presence and the use of such an electrically drivable auxiliary oil pump 11 is particularly useful for the operation of a motor vehicle 7 having a motor stop automatic element, it can also be used advantageously in those motor vehicles that are being operated without such motor stop automatic element. In addition to the motor stop automatic operating mode, the electrically driven auxiliary oil pump 11 can thus also be operated efficiently in other operating phases together with the main oil pump 7, or it can be used for other functions independent from the demand to the volumetric flow rate from the automatic transmission 3.

DETAILED DESCRIPTION OF THE INVENTION

Figure 2:
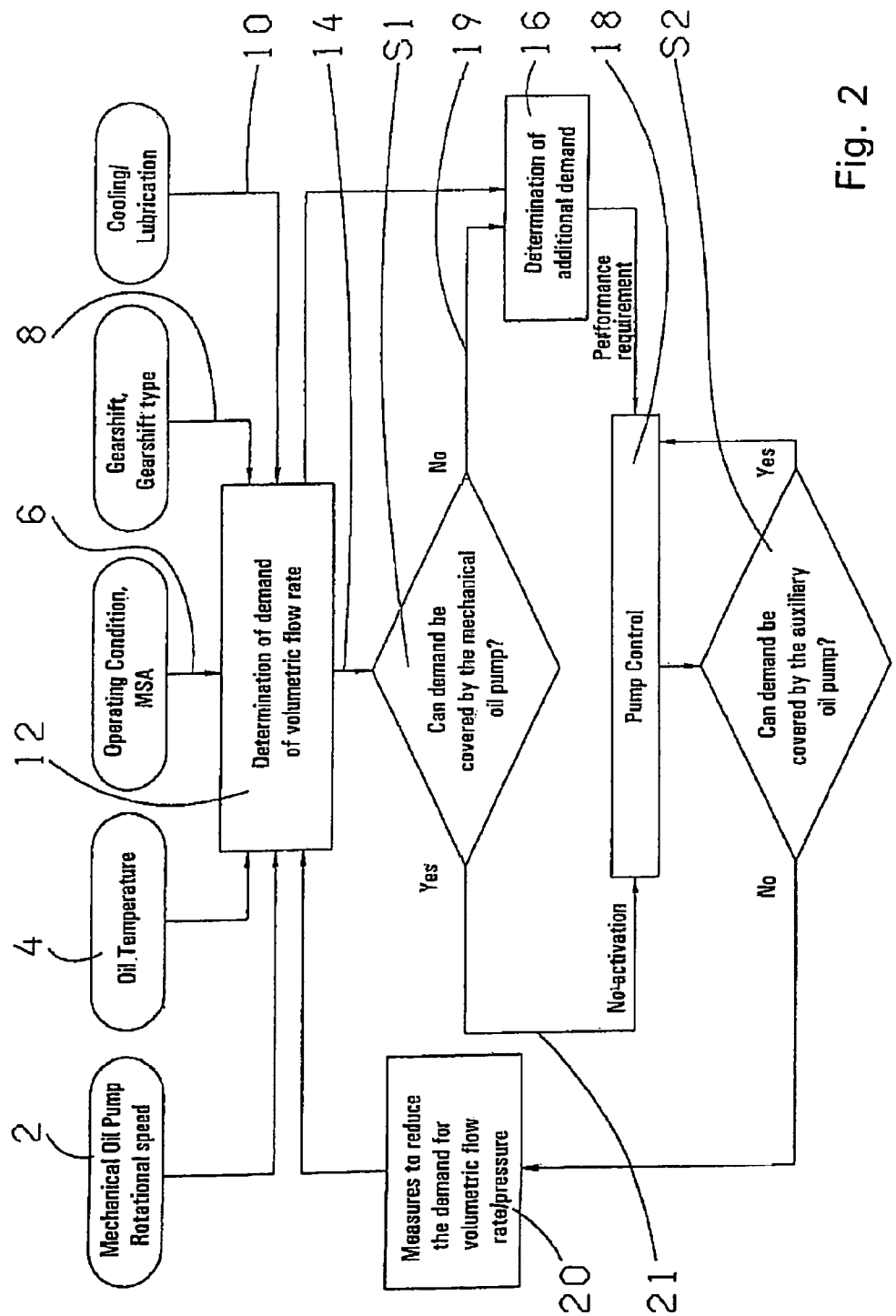
FIG. 2 is a flow diagram of the method of controlling drive of an automatic transmission according to the invention.

As part of the drive control device, the automatic transmission is associated with an electronic control device, which also communicates with the hydraulic control device as part of a hydraulic control system and, if applicable, forms a structural unit therewith. The functions of this control device are illustrated in FIG. 2.

In the electronic control device, the model of a device for determining the required volumetric flow rate is implemented, which also processes signals from sensors, signals (for example motor speed) from a vehicle data transmission system (CAN bus) as well as output signals from other model calculations. Such a module is preferably designed as an electronic data processing program.

The current rotational speed of the mechanically driven main oil pump is thus determined by sensor 2 and the current oil temperature of the transmission is determined by sensor 4, the current operating condition of the MSA is captured by input 6, the information regarding the currently engaged transmission shift position and the planned shift type are captured by input 8, and the oil volumetric flow rate, which is currently needed to meet the lubrication requirement and the cooling function of the automatic transmission, is captured, aided by a model, by input 10. The necessary volumetric flow value for the currently required target volumetric flow rate of the transmission oil is determined from this information in calculation block 12.

The calculated value of the target volumetric flow rate is fed, via an output 14 of the calculation block 12, to the logical step S1, where it is verified if the demand corresponding to the target value is to be provided solely by the mechanically drivable main oil pump 7. The necessary logical decision is based on another model, which determines the actual volumetric flow rate, which must be delivered during the current operating condition by the main oil pump 7, by way of a device (not illustrated) for determining the volumetric flow rate.

If the comparison in step S1 is a logical No, meaning the demand for transmission oil cannot be solely covered by the main oil pump 7, the currently necessary additional demand for an oil volumetric flow rate is then determined in another calculation block 16 by applying the value for the target volumetric flow rate, which is also forwarded via output 14 (arrow 19).

As a result, a value (to initiate required operation) is supplied by the calculation block 16 to a calculation block 18 of the pump control, the block being associated with the auxiliary oil pump. This value, which is known for each pump type and expressed by an electrical voltage or a control signal (CAN bus signal), supplies—through the correlation of the rotational speed of the pump, the oil temperature and the delivered volume—the deliverable oil volumetric flow rate of the auxiliary oil pump 11. The value for the oil volumetric flow rate, which can be delivered by the auxiliary oil pump 11, is sent to a logical step S2. There it is verified whether the additional demand, which was determined in calculation block 16, can be delivered via the electrically driven auxiliary oil pump 11.

If this comparison provides a logical No, this comparison result is sent to a calculation block 20, where measures will be implemented to reduce the current volume and/or pressure demand of the automatic transmission 3.

If this comparison operation in step S1 provides a logical Yes, the pump control in calculation block 18 is not activated (see arrow 21). If the comparison operation in step S2 establishes that the additional demand regarding the oil volumetric flow rate, which has been calculated in calculation block 16, can be satisfied by the electrically driven auxiliary oil pump 11, then no value is sent to calculation block 20.

The control operation of the automatic transmission 3 will be manipulated if the calculation block 20 is activated. The control operation is here manipulated by one or more originators of the supply demand in a particularly distinctive manner according to the respectively prevailing operating conditions. One method is, for example, the manipulation of the filling of a hydraulic clutch actuator by reducing the clutch filling pressure, which results in a slightly extended filling time while at the same time changing spontaneity.

While this method perhaps manipulates the transmission control in a manner noticeable to the driver, other methods can briefly alter, for example, tolerance levels for the operation of the transmission to such a degree that the currently required target volumetric flow rate can still be considered deliverable. The demand for oil cooling can thus be reduced as a function further marginal conditions, such as the actual air temperature, coolant temperature and possibly a driver profile in respect of the driver's characteristics.

For the previously described drive control device 9, it is irrelevant that via the input 6 in the calculation block 12 the operating condition "motor off" is reported in any case before the additional steps are initiated. Rather, the volumetric flow rate and/or pressure to be delivered by the main oil pump 7 may be too low for transmissions while the internal combustion engine 5 is running in a low rotational speed range. The auxiliary oil pump 11 can, in such case, also be used preferably outside of the initial MSA function.

The electrically driven auxiliary oil pump 11 can also be used in wide operating ranges to cover peak demands and therefore relieve the main oil pump 7. This allows the main oil pump 7 to be sized smaller than usual, which during the actual driving operation leads to a reduced pump starting torque and associated fuel savings.

In an alternative development of the present invention, it can be advantageous for an adaptation of tolerances, wear and tear and/or defects in the automatic transmission, to use the pressure development in the transmission oil that has been captured by way of a pressure sensor as a feedback variable as to whether the modeled supply demand for transmission oil agrees with the actually required demand.

REFERENCE NUMERALS

1 passenger car
2 sensor
3 automatic transmission
4 sensor
5 internal combustion engine
6 input
7 main oil pump
8 input
9 hydraulic control device
10 input
11 auxiliary oil pump
12 calculation block
13 motor stop automatic (MSA) element
14 output
16 calculation block
18 calculation block
19 arrow from S1 to 16
20 calculation block
21 arrow from S1 to 18
S1 step
S2 step

The invention claimed is:

1. A drive control device for an automatic transmission of a motor vehicle, the drive control device comprising:
   an internal combustion engine driving a main oil pump;
   an electrically drivable auxiliary oil pump;
   a hydraulic control device for controlling the automatic transmission;
   a device for determining a target volumetric flow, required during current operating conditions of the automatic transmission and the motor vehicle, with the target volumetric flow based on oil temperature within the automatic transmission;
   a device for determining an actual volumetric flow rate deliverable during the current operating conditions of the automatic transmission and the motor vehicle by at least one of the main oil pump and the auxiliary oil pump; and a device for reducing the target volumetric flow rate, if the currently deliverable actual volumetric flow rate is lower than value of the current target volumetric flow rate, to at least the currently deliverable actual volumetric flow rate.

2. The drive control device according to claim 1, further comprising a control device for a motor stop automatic element (MSA) for automatically shutting down the internal combustion engine during certain operating conditions of the motor vehicle.

3. A method for controlling drive of an automatic transmission of a motor vehicle, the motor vehicle being provided with an automatic transmission having a main oil pump, which can be driven by an internal combustion engine, and an electrically drivable auxiliary oil pump, further having a hydraulic control device for the automatic transmission, the method comprising the steps of:

determining a target volumetric flow rate of the automatic transmission, required during a current operating condition, based on an oil temperature within the automatic transmission;

determining an actual volumetric flow rate delivered by at least one of the main oil pump and the auxiliary oil pump; and reducing the target volumetric flow rate, if the actual volumetric flow rate is than the target volumetric flow rate, to at least the actual volumetric flow rate.

4. The method according to claim 3, further comprising the step of determining the target volumetric flow rate based on a rotational speed of the main oil pump.

5. The method according to claim 3, further comprising the step of determining the target volumetric flow rate based on a current operating condition of a motor stop automatic element (MSA).

6. The method according to claim 3, further comprising the step of determining the target volumetric flow rate based on gear shifts of the automatic transmission performed by the hydraulic control device.

7. The method according to claim 3, further comprising the step of determining the target volumetric flow rate based on at least one of cooling and lubrication requirements of the automatic transmission.

8. The method according to claim 3, further comprising the step of reducing the target volumetric flow rate by reducing a clutch fill pressure for filling of a hydraulic actuator of a clutch associated with the automatic transmission.

9. The method according to claim 3, further comprising the step of reducing the target volumetric flow rate by adjusting target volumetric flow rate tolerance levels for at least one of signals and values sent to determine the target volumetric flow rate.

10. A method of controlling drive of an automatic transmission of a motor vehicle having an internal combustion engine, a hydraulic control device, a main oil pump and an auxiliary oil pump, the method comprising the steps of:

controlling the automatic transmission with the hydraulic control device;

driving the main oil pump with the internal combustion engine to provide a hydraulic flow for hydraulically actuating the automatic transmission;

electrically driving the auxiliary oil pump to provide a hydraulic flow for hydraulically actuating the automatic transmission;

determining a target volumetric flow, which is required by the automatic transmission under current operating conditions, based on an oil temperature within the automatic transmission;

determining an actual volumetric flow which is deliverable by at least one of the main oil pump and the auxiliary oil pump; and reducing the target volumetric flow rate, if the actual volumetric flow rate is less than the target volumetric flow rate, to at least the actual volumetric flow rate.

11. The method according to claim 10, further comprising the step of determining the target volumetric flow rate further based on at least one of a current rotational speed of the main pump, a current on/off state of an automatic motor shut off element, a currently engaged transmission shift position and a current flow volume of at least one of a cooling oil and a lubrication oil.

* * * * *